F. STITZEL.
SPRING WHEEL.
APPLICATION FILED JAN. 15, 1913.
1,089,979.
Patented Mar. 10, 1914.
2 SHEETS—SHEET 1.
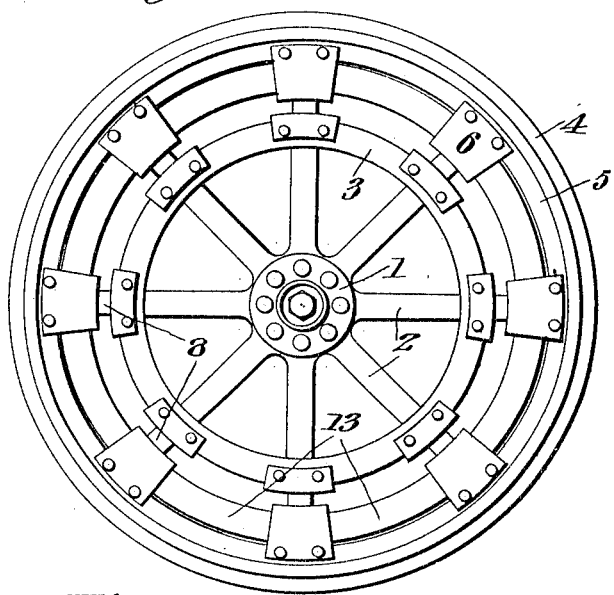
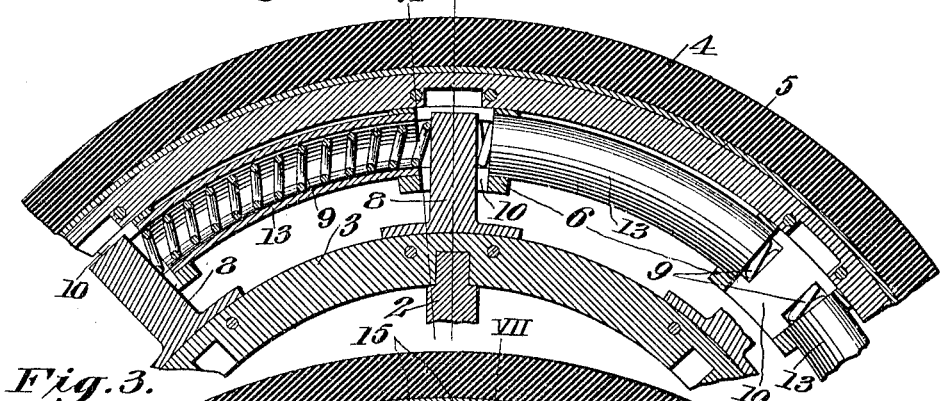
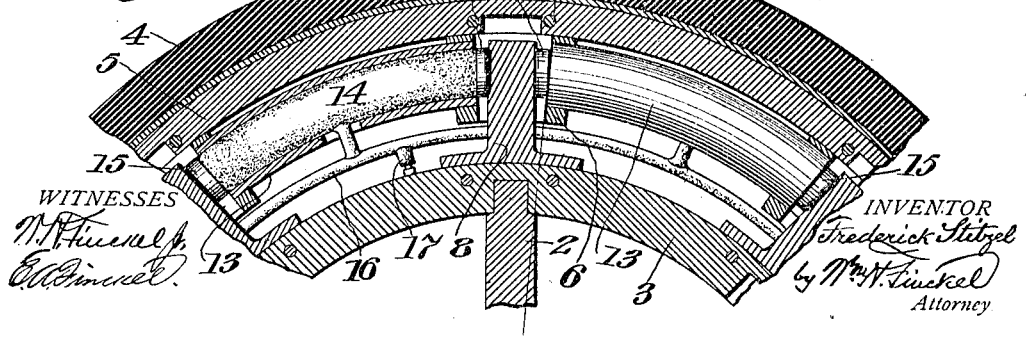
WITNESSES
INVENTOR
Frederick Stitzel
by Wm. W. Finckel
Attorney F. STITZEL.
SPRING WHEEL.
APPLICATION FILED JAN. 15, 1913.
1,089,979.
Patented Mar. 10, 1914.
2 SHEETS—SHEET 2.
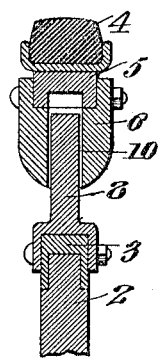
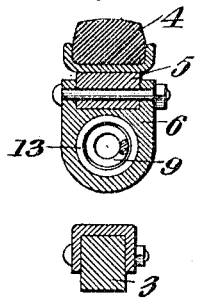
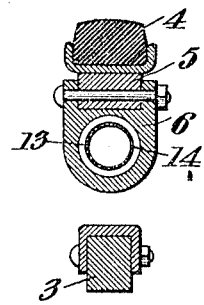
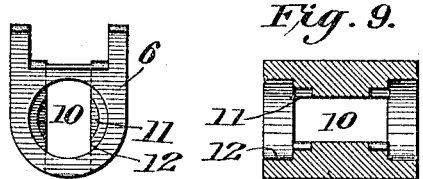
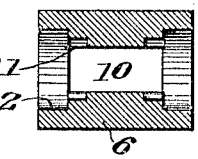
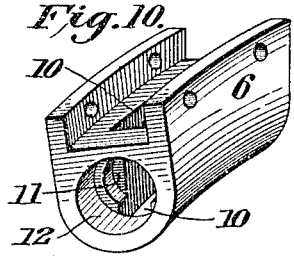
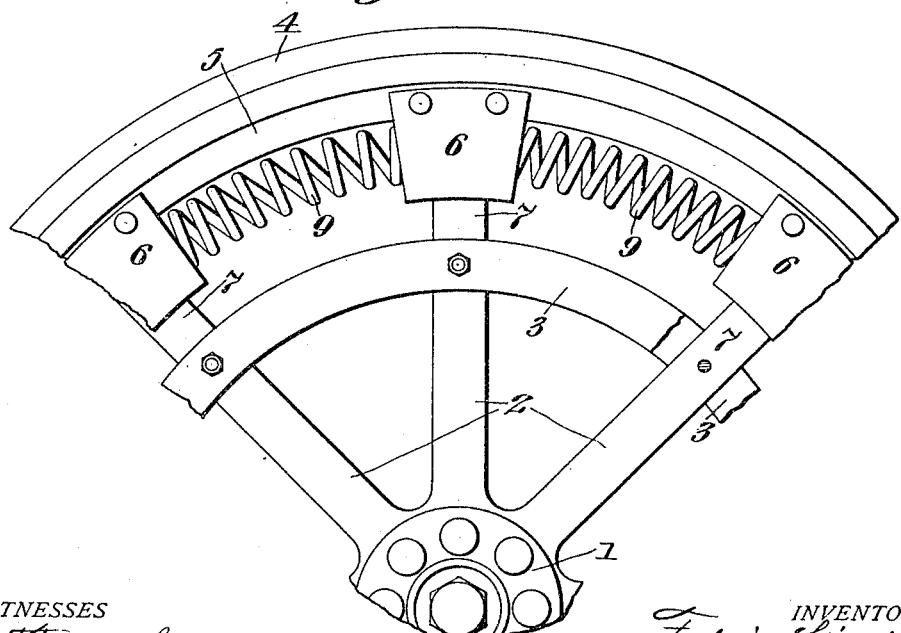
WITNESSES
INVENTOR
Frederick Stitzel
by
Attorney

UNITED STATES PATENT OFFICE.

FREDERICK STITZEL, OF LOUISVILLE, KENTUCKY.

SPRING-WHEEL.

1,089,979.

Specification of Letters Patent.

Patented Mar. 10, 1914.

Application filed January 15, 1913. Serial No. 742,193.

*To all whom it may concern:*

Be it known that I, FREDERICK STITZEL, a citizen of the United States, residing at Louisville, in the county of Jefferson and State of Kentucky, have invented a certain new and useful Improvement in Spring-Wheels, of which the following is a full, clear, and exact description.

The object of this invention is to provide a spring or cushioned wheel, for use on motor cars and other vehicles.

The invention consists of a wheel having an inner member and an outer member, wherein the inner member, which contains the hub spokes and and spoke connecting rim, is of rigid construction, and the outer member, which contains the rim and tire is connected with the inner member in such a manner as to yield circumferentially and thus allow the inner member to yield vertically while supported by the yielding connections, differing thus from those prior constructions wherein radially arranged springs or other resilient devices are used, and being an improvement upon those prior wheels wherein circumferentially arranged resilient members are employed, as I will proceed now to explain and finally claim.

In the accompanying drawings illustrating the invention, in the several figures of which like parts are similarly designated, Figure 1 is an elevation of one embodiment of my invention. Fig. 2 is an elevation of part of the same wheel, on a larger scale, showing one of the springs in section. Fig. 3 is a view similar to Fig. 2 showing the substitution of air-cushions for metal springs as the resilient members. Fig. 4 is an elevation showing a segment of a wheel using metal springs as the resilient members without casings. Figs. 5, 6 and 7 are detail cross-sections taken respectively in the planes V and VI of Fig. 2 and VII of Fig. 3. Figs. 8, 9 and 10 are respectively an end elevation, a horizontal section, and a perspective view of the socket for the resilient members and spoke.

The inner member of the wheel comprises a hub 1 of any approved construction, having spokes 2 which are connected by a rim, or a band or ring, as indicated at 3, which several parts are rigidly connected. The outer member of the wheel comprises a tire 4, a rim 5 and a series of spoke-sockets 6 adapted to receive the spoke ends 7, Fig. 4, or extensions 8 thereof, Figs. 1, 2, 3 and 5, and the resilient members, such as metallic springs 9 Figs. 2 and 4, the ends of these springs being set in the sockets under compression and adapted to be engaged and further compressed by the spokes as the wheel turns. These springs are so arranged in the spoke sockets with reference to the spokes that they yieldingly support the under side of those spokes which are descending, while the upper sides of said descending spokes are relieved of the pressure of the springs, and also afford yielding resistance to the upper side of the ascending spokes while the undersides of said ascending spokes are relieved of pressure of the springs, so that said springs are active throughout substantially the entire circumference of the wheel.

The spoke-sockets 6 are secured to the outer member or rim of the wheel and project inwardly therefrom, and are provided with radially arranged longitudinal recesses 10 to receive the ends of the spokes or their extensions, and of a width to permit sufficient play thereof within the elastic limit of the springs. The opposite ends of the sockets are counterbored at 11 to form seats for the springs of sufficient depth to permit the springs to normally engage the ends of the spokes; and if the springs are incased, these socket ends are provided with seats 12 to receive the ends of the tubular casings 13. But, as shown in Fig. 4, the springs need not be incased.

As shown in Fig. 4, the spoke ends 7 may extend into the spoke-sockets 6, but as shown in Figs. 1, 2, 3 and 5, spoke-end extensions 8 may be fixed to the rim of the inner wheel and engage the sockets and springs.

As shown in Fig. 3, air-cushions 14 may be substituted for the metallic springs. These cushions may be inflated bags having their ends sealed and provided with metallic caps 15. The several cushions may be inflated from a common source, such as a pipe 16 having a connection 17 for the air-pump, or they may be otherwise inflated. These cushions are arranged in casings 13 like those used for the metallic springs, and they operate in substantially the same way as the metallic springs.

The spoke ends or their extensions vibrate between the springs within the sockets as the wheel turns, and in so doing further compress the springs. When a load causes the inner member of the wheel to sink, the spokes, as it were, leave the uppermost or rearward springs, for the springs can follow the spokes only to the spring seats. The load is shifted on the springs as the wheel turns, but said springs are active on the spokes on both sides of a perpendicular within the limits of the spring seats.

By the term "resilient members" as used in the claims, I do not mean to limit the invention to metallic springs, but inasmuch as the air-cushions operate substantially as resilient members, I mean to include such air-cushions in the claims as well as other resilient mediums that operate substantially as metallic springs or air-cushions.

What I claim is:—

1. A spring wheel, having an inner member including a hub and spokes and movable independently of and combined with an outer member, said outer member having spoke-sockets fixed thereto and projecting inwardly therefrom and recessed radially to receive the spokes, and circumferentially arranged resilient members supported at their ends in and between the spoke-sockets inside said outer member and having their opposite ends normally engaging adjacent spokes and adapted to be compressed by the spokes in opposite directions upon opposite sides of the vertical axis of the wheel as the wheel turns.

2. A spring wheel, having an inner member including a hub and spokes and movable independently of and combined with an outer member, said outer member having spoke-sockets fixed thereto and projecting inwardly therefrom and recessed radially to receive the spokes, and circumferentially arranged resilient members supported at their ends in and between the spoke-sockets inside said outer member and having their opposite ends normally engaging adjacent spokes and adapted to be compressed by the spokes in opposite directions upon opposite sides of the vertical axis of the wheel as the wheel turns, said sockets having seats to relieve the spokes of the effective force of the resilient members in opposite directions upon opposite sides of the vertical axis of the wheel as the wheel turns.

3. A spring wheel, having an inner member including a hub and spokes and movable independently of and combined with an outer member, said outer member having spoke-sockets fixed thereto and projecting inwardly therefrom and recessed radially to receive the spokes, and circumferentially arranged resilient members supported at their ends in and between the spoke-sockets inside said outer member and having their opposite ends normally engaging adjacent spokes and adapted to be compressed by the spokes in opposite directions upon opposite sides of the vertical axis of the wheel as the wheel turns, said sockets having seats to relieve the spokes of the effective force of the resilient members in opposite directions upon opposite sides of the vertical axis of the wheel as the wheel turns, and casings inclosing the resilient members and seated in the spoke-sockets.

4. A spring wheel, having a hub, spokes and means to connect the spokes at or near their outer ends, and a rim having spoke-sockets secured thereto and projecting inwardly therefrom and recessed radially to receive the ends of the spokes and permit play therein both radially and circumferentially of the wheel, and resilient members seated in said sockets under compression normally engaging said spokes and adapted to be compressed by and disengaged from the opposite sides of the spokes upon opposite sides of the vertical axis of the wheel relatively to the direction of rotation of the wheel.

5. A spring wheel, having a hub, spokes and means to connect the spokes at or near their outer ends, and a rim having spoke-sockets fixed thereto and projecting inwardly therefrom and recessed radially to receive the ends of the spokes to permit play therein both radially and circumferentially, and resilient members seated at their ends in said sockets circumferentially of and inside the rim of the wheel and normally engaging the opposite sides of the spokes and adapted to be compressed thereby in opposite directions upon opposite sides of the vertical axis of the wheel relatively to the direction of rotation of the wheel.

In testimony whereof I have hereunto set my hand this ninth day of January A. D. 1913.

FREDERICK STITZEL.

Witnesses:
GEORGE MERCKE,
KATIE WELSH.

---

Copies of this patent may be obtained for five cents each, by addressing the "Commissioner of Patents, Washington, D. C."